No. 895,788. PATENTED AUG. 11, 1908.
J. C. POTTER.
MEANS FOR OPERATING TURRET CROSS SLIDES.
APPLICATION FILED MAY 29, 1903.
2 SHEETS—SHEET 1.
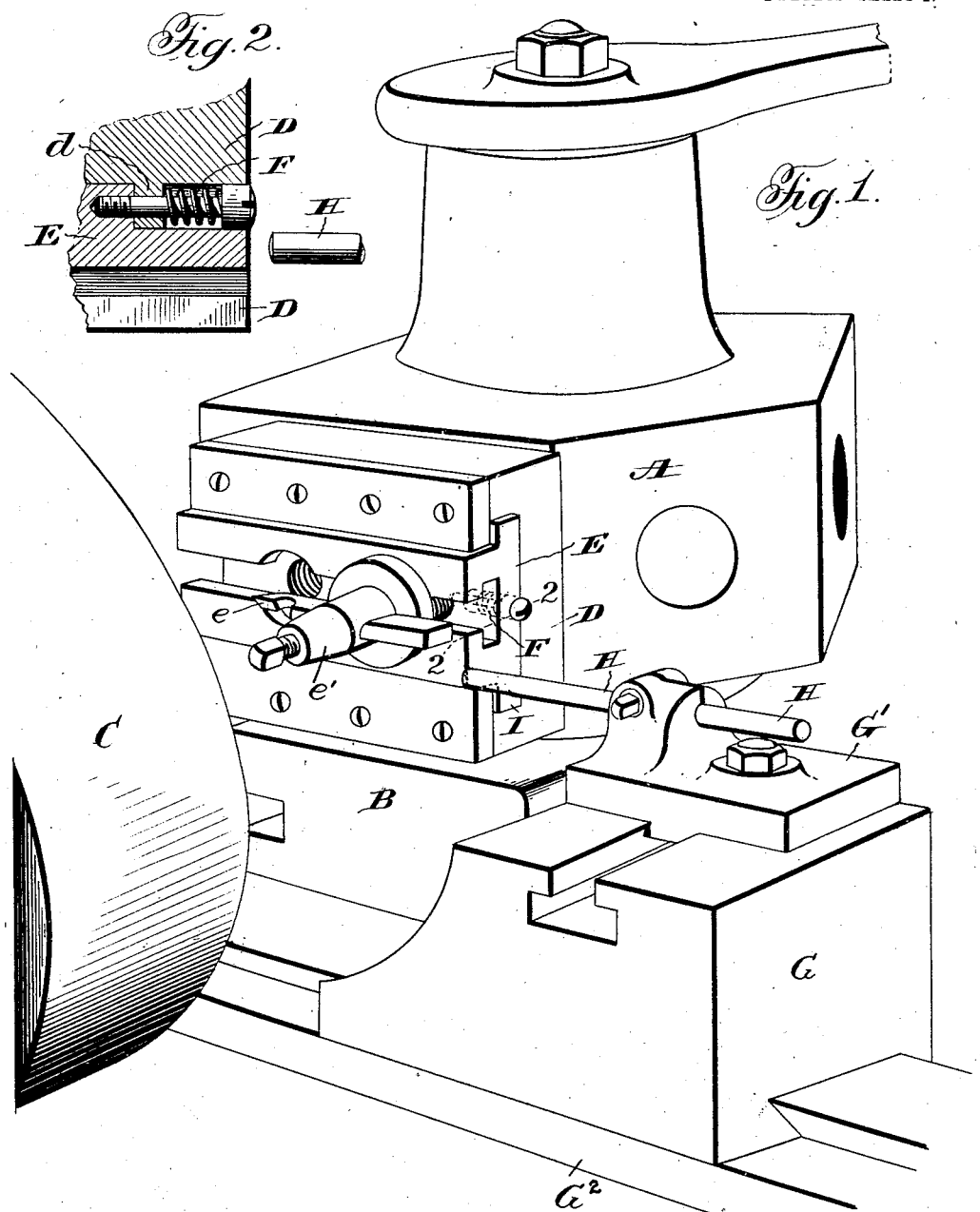
Witnesses:
Jas. E. Hutchinson
J. L. Lawlor
Inventor:
James C. Potter,
by Edwin J. Prindle,
atty.

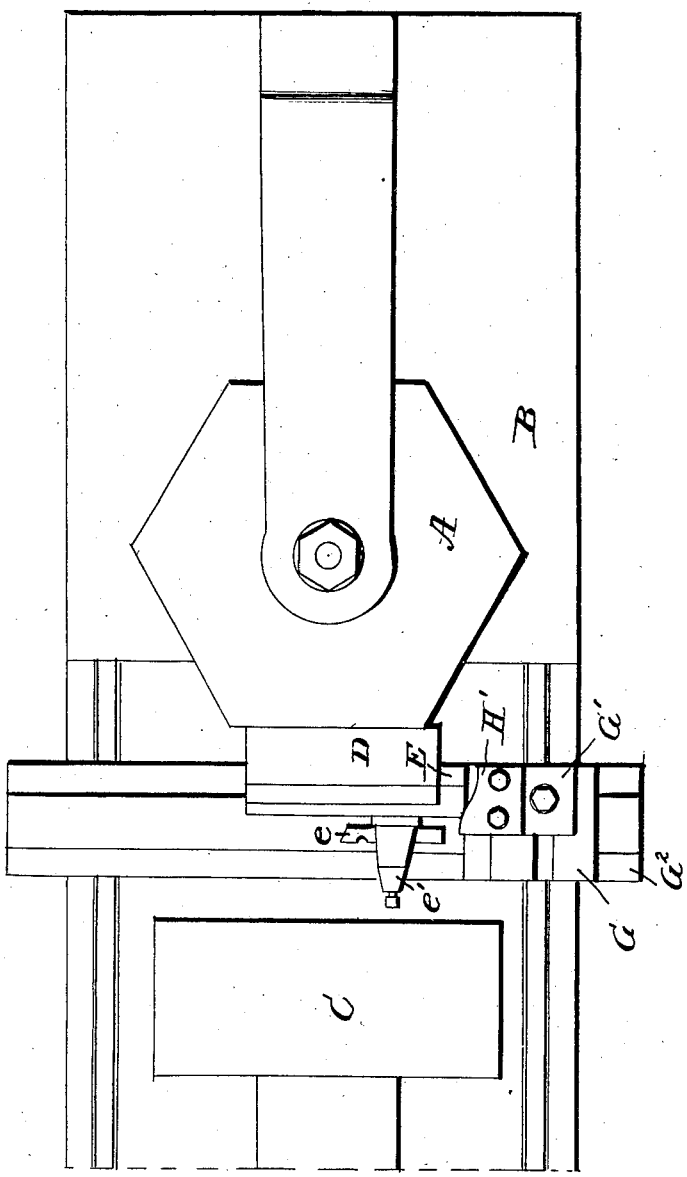

UNITED STATES PATENT OFFICE.

JAMES CHARLES POTTER, OF PAWTUCKET, RHODE ISLAND, ASSIGNOR TO POTTER AND JOHNSTON MACHINE COMPANY, OF PAWTUCKET, RHODE ISLAND, A CORPORATION OF RHODE ISLAND.

MEANS FOR OPERATING TURRET CROSS-SLIDES.

No. 895,788.     Specification of Letters Patent.     Patented Aug. 11, 1908.

Application filed May 29, 1903. Serial No. 159,331.

*To all whom it may concern:*

Be it known that I, JAMES CHARLES POTTER, of Pawtucket, in the county of Providence, and in the State of Rhode Island, have invented a certain new and useful Improvement in Means for Operating Turret Cross-Slides, and do hereby declare that the following is a full, clear, and exact description thereof, reference being had to the accompanying drawings, in which—

Figure 1 is a perspective view of portion of a turret lathe embodying my invention; Fig. 2 is a cross section on the line 2—2 Fig. 1, and Fig. 3 a plan view of a portion of a turret lathe embodying a different form of my invention.

In turning irregular or other unusual shapes it is desirable to impart to the turning tool a compound motion, and the object of my invention is to provide simple and otherwise desirable means for producing the desired compound movement of a turning tool, and to this end my invention consists in a lathe having the features of construction substantially as hereinafter specified and claimed.

The type of lathe which I have chosen in which to embody my invention is a turret lathe such as is shown in United States Patent No. 752,257, February 16th, 1904, and the tool to which I impart the compound movement, is one carried by the turret. The turret A of the lathe illustrated is of ordinary construction, being provided in its sides with holes or sockets for the shanks of the various tools to be used and supported on a slide B that is reciprocable in ways or guides towards and from the work, held in a chuck C.

Any suitable means may be employed for reciprocating the turret slide and as such means form no part of the present invention, it is not thought necessary to illustrate and describe the same. Mounted on the turret by means of a shank which fits one of the two holes or sockets of the turret is a bed or way D for a tool-carrying slide E, the latter, when in its position for the tool to be used, constituting a cross-slide. A coil spring F acting at one end on the slide E yieldingly holds the latter at one limit of its motion, such limit being fixed by a suitable stop $d$ on the bed D, against which the slide strikes. The lathe is also provided in the usual place between the turret slide and the chuck or work-holder with an ordinary cross-slide G, such as is shown in the patent hereinbefore mentioned, having the usual or any desired means for reciprocating it, which means are not shown nor will they be described as they form no part of the present invention.

Mounted upon the ordinary cross-slide G on the shears $G^2$ is a projection or bearing surface H, situated so that it can engage either a part attached to, or the end I of the turret cross-slide E, and thereby impart movement to the latter from the ordinary cross-slide G, when the cross-slide G is moved. On the retraction of the cross-slide G, the cross-slide E will be moved by the action of the spring F. The tool $e$ carried by the turret cross-slide E will thus be moved transversely of the work. Said tool $e$, shown as an ordinary cutter is secured to the turret cross-slide E by a tool post or clamp $e'$ of usual construction. The projection or bearing surface H is illustrated as a rod which is clamped to a block $G'$ adjustably mounted upon the top of a cross-slide G of ordinary construction, which is mounted upon the ordinary shears $G^2$.

The bearing surface H may be of such form that it acts to move the turret cross-slide E only when the ordinary cross-slide is moving or it may be given a cam form as shown in Fig. 3, where it is designated H' so that the part of the movement of the turret cross-slide E will be produced when the ordinary cross-slide is stationary, the transverse movement of the turret cross-slide in such case being produced by the movement of the turret slide.

In some cases it may be desirable to produce all the required transverse movement of the turret cross-slide solely by the movement of the turret slide, the ordinary cross-slide remaining stationary and its bearing surface H being given the form necessary to produce the desired movement of the turret cross-slide.

It will be seen that as a result of the movement of the turret slide in the direction towards the work and of the action of the bearing surface H of the ordinary cross-slide, either by the movement of the latter or by reason of a simple cam action, or by both of these, a compound movement will be imparted to the turret cross-slide tool, thus enabling the turning of irregular or taper surfaces not possible by a simple rectilinear movement of the tool.

Although the turret cross-slide is shown as applied to the turret in the form of a separable tool or attachment, it may, if desired, be permanently attached to the turret and, of course, other changes from the particular embodiment of my invention which I have shown or described for the purpose of illustrating the invention can be made which will involve no departure from the principle of my invention.

Having thus described my invention, what I claim is:

1. In a lathe, the combination of two tool-slides, or holders whose paths of movement lie in the same direction, means whereby one receives its movement from the other, and a movable support for the tool-slide that is moved, which support has a path of movement crosswise of said other paths, the tool slide that is moved carrying a tool arranged to work while both movements of its slide are in progress.

2. In a lathe the combination of a turret, a cross-slide carried thereby, a second cross-slide, and means whereby the latter co-acts with the turret cross-slide to cause the movement of the turret cross-slide, said turret cross slide carrying a tool arranged to work while the movement of the turret cross slide is in progress.

3. In a lathe, the combination of a turret, a reciprocable slide on which it is mounted, a cross-slide on the turret, a second cross-slide, and means whereby movement of the turret slide may be caused from said second slide.

In testimony that I claim the foregoing I have hereunto set my hand.

JAMES CHARLES POTTER.

Witnesses:
JOHN JOHNSTON,
EARL H. ROBERTS.